United States Patent
Salo

[11] Patent Number: 5,822,999
[45] Date of Patent: Oct. 20, 1998

[54] REFRIGERATION SYSTEM

[75] Inventor: Miguel Jornet Salo, Barcelona, Spain

[73] Assignee: Electrolux Espana, S.A., Madrid, Spain

[21] Appl. No.: 848,890

[22] Filed: May 1, 1997

[30] Foreign Application Priority Data

May 3, 1996 [ES] Spain ................................ 9600994

[51] Int. Cl.⁶ .................................................. F25B 41/00
[52] U.S. Cl. ............................ 62/196.3; 62/205; 62/215
[58] Field of Search .............................. 62/498, 196.1, 62/196.3, 205, 215

[56] References Cited

U.S. PATENT DOCUMENTS

| | | | |
|---|---|---|---|
| 1,858,517 | 5/1932 | Marshall . | |
| 3,060,699 | 10/1962 | Tilney | 62/215 |
| 3,252,298 | 5/1966 | Andrews . | |
| 3,710,586 | 1/1973 | Maudlin | 62/498 X |
| 3,864,934 | 2/1975 | Jeding et al. | 62/196.1 |
| 4,499,739 | 2/1985 | Matsuoka et al. | 62/196.3 X |
| 4,671,075 | 6/1987 | Iijima et al. | 62/196.1 |

FOREIGN PATENT DOCUMENTS

| | | |
|---|---|---|
| 0 504 738 | 9/1992 | European Pat. Off. . |
| 0 504 775 | 9/1992 | European Pat. Off. . |
| 6-117707 | 4/1994 | Japan ........................................ 62/498 |
| 1002011 | 4/1987 | Spain . |
| WO 92/0633 | 4/1992 | WIPO . |

*Primary Examiner*—Henry A. Bennett
*Assistant Examiner*—Susanne C. Tinker
*Attorney, Agent, or Firm*—Pearne, Gordon, McCoy & Granger LLP

[57] ABSTRACT

Improved refrigeration system, in particular for domestic use, with a compressor (2), a condenser (3), an evaporator (4) and a valve (5) arranged between the condenser (3) and evaporator (4). The system includes a three-way valve (6) between the condenser (3) and the compressor (2) which establishes a bypass (7) between the compressor (2) and the suction pipe (8) of the system (1) during stoppage of the compressor (2) which blocks the reflux of refrigerant contained in the condenser (3) to the compressor.

3 Claims, 1 Drawing Sheet

REFRIGERATION SYSTEM

BACKGROUND OF THE INVENTION

The present invention relates to an improved refrigeration system for reducing energy consumption which avoids the counterbalancing of the pressures existing in this system.

In domestic refrigeration systems one of the performances currently receiving major attention is the minimizing of energy consumption. This is justified, on the one hand, by the overall national saving in the cost of energetic products and, on the other hand, by the negative ecological effects produced by the emission of greenhouse gases owing to their combustion.

Domestic refrigeration systems are based, almost entirely, on the so-called steam compression cycle, in which the consumption of energy is due to the heat stored by the steam on increasing its pressure including the losses of mechanical and electrical yield of the compressor.

Operation of the refrigerator system involves a process of expansion of the compressed refrigerant which, in virtually all the domestic systems and in many of the commercial or air conditioning type ones, is produced by the loss of load on the same circulating through a long pipe with small cross-section (capillary pipe). When the compressor stops by intervention of the thermostat, the capillary pipe allows a continuous flow of the refrigerant until the pressures in the evaporator and in the condenser equalize. This means that when the compressor starts up again the initial moments consume energy in order to establish the pressure range necessary for the effective production of coldness. If counterbalancing of the pressures is avoided during the time the compressor is at a standstill, the need for this initial consumption is reduced.

If a thermostatic expansion valve is used, instead of the capillary pipe, counterbalancing of the pressures is avoided on stopping the compressor, but this is not the objective of such valve, which is, moreover, an expensive component.

Constructive arrangements have been described wherein in a system with expansion by capillary pipe, counterbalancing of the pressures is avoided during the time the compressor is at a standstill. In these cases a compressor with a high starting torque is used—i.e., with starter condenser and, therefore, expensive—since with unbalanced pressures a compressor having a low starting torque does not start up.

Thus, for example, European Patent 0 551 361, in the name of The University of Leeds, sets forth a steam compression system in which, to reduce the energy consumption, use is made of the pressure and the flow rate of refrigerant in the components of the system. The pressure differential is maintained by a needle float valve arranged between the condenser and the evaporator of the system.

In European Patent 0 504 775, in the name of Ranco Incorporated of Delaware, a valve is described for control of the sub-cooling flow rate of a refrigeration system. In that system this valve controls the flow rate of refrigerant of the system in response to the sub-cooling, blocking the flow rate of refrigerant from the condenser when the compressor is switched off and activating circulation of the hot gaseous refrigerant in extreme high temperature environmental conditions.

European Patent 0 504 738, issued in the name of White Consolidated Industries, Inc., claims a refrigerator system with a valve for control of the sub-cooling flow rate. In such document, the valve is actuated by means of an hermetic bellows containing refrigerant, for the purpose of this valve responding to the liquid entering it. The valve is calibrated so that only a sub-cooled liquid refrigerant can flow through it, and if the refrigerant which enters exceeds a particular level, this valve will close until entirely blocking all flow between the condenser and the evaporator, the valve remaining in closed position whenever the compressor is not in operation.

Spanish Utility Model 1002011, issued in the name of Necchi Societa per Azioni, discloses a refrigeration installation arrangement, in which the system comprised by a compressor having a high starting torque, which comprises a condenser and an evaporator, is characterised in that between said condenser and evaporator means are provided in the form of a valve for opening and closing passage of the refrigeration fluid in sequence with the compressor actuation cycle, the said means preventing a counterbalancing of the impulsion and suction pressures when the compressor stops.

SUMMARY OF THE INVENTION

The refrigeration system which is the subject of the present application seeks to improve on all the systems known in the present state of the art, for which purpose there has been provided, in said system, together with the valve which prevents a counterbalancing of the pressures, a second three-way valve whose purpose is to establish a communication between the discharge and suction pipes of the system during stoppage of the compressor while blocking the reflux of refrigerant contained in the condenser of the system. With this arrangement, starting up of the compressor is produced under counterbalanced pressures and a compressor having a low starting torque can be used with this system the energy consumption can be reduced between 8 and 15% (without considering the possible consumption of the arrangement itself) depending on the type of apparatus.

Thus, according to the invention the refrigeration system, intended in particular for domestic use, is supplied by a compressor, including a condenser, an evaporator and a valve arranged between said condenser and evaporator, intended to open and close passage of the refrigerant fluid, wherein a three-way valve is provided between the condenser and the compressor. The three-way valve establishes a bypass between the compressor and the suction pipe of the system during stoppage of the compressor which blocks the reflux of refrigerant contained in the condenser.

Pursuant to the invention, the refrigeration system incorporates a compressor having a low starting torque.

According to the invention, between the drive of the compressor and that of the valves delay devices such as timers can optionally be provided.

BRIEF DESCRIPTION OF THE DRAWING

A preferred form of embodiment of the invention will next be explained in greater detail, making reference to the accompanying drawings. It has to be understood that this form of embodiment is merely explanatory, without in any way limiting the scope of the present invention. The sole FIGURE of the drawings shows a schematic representation of the refrigeration system according to the present invention with the compressor in operation.

DESCRIPTION OF THE PREFERRED EMBODIMENT

Figure 1:
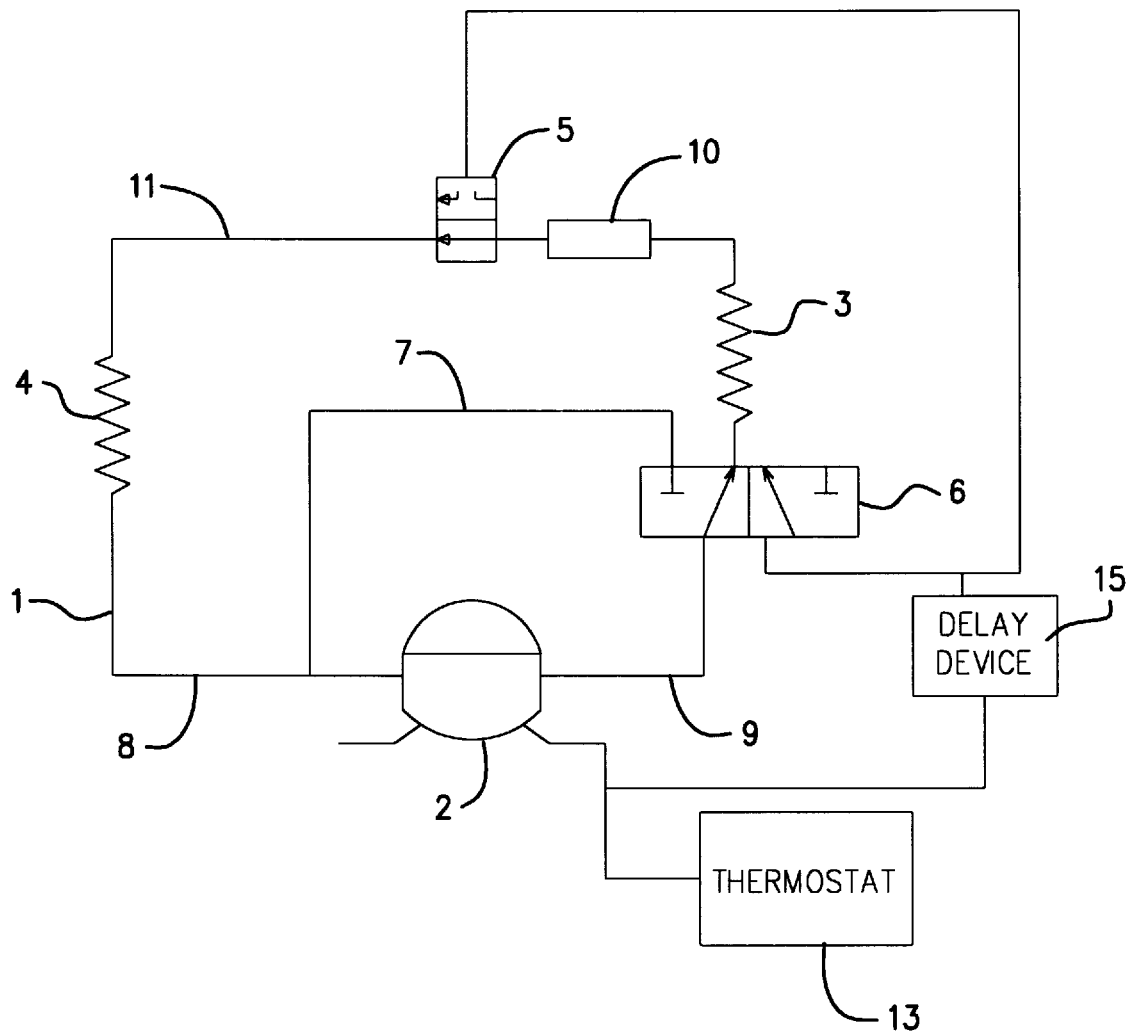

With reference to the drawing, the refrigeration system (1) according to the present invention is shown to include a compressor (2), a condenser (3), an evaporator (4), and a capillary pipe (11). Preferably, the compressor has a low starting torque.

Between the condenser (3) and the evaporator (4) a valve (5) is arranged which avoids a counterbalancing of the pressures which is governed simultaneously with the compressor (2). Between the condenser (3) and the compressor (2) a three-way valve (6) is arranged. Naturally, it is contemplated that the illustrated three-way valve could be replaced by any other valve or device or combination of valves and devices having an equivalent function. This valve (6) establishes a bypass (7) between the compressor (2) and the suction tube (8) during stoppage of the compressor at the same time as the reflux of refrigerant contained in the condenser is blocked. With reference number (9) the discharge pipe is designated and with reference number (10) a dehydrator filter arranged between the valve (5) and the condenser (3).

Making reference to the FIGURE described above which, as already indicated, constitutes a form of preferred embodiment of the present invention, operation of the refrigeration system subject of the present invention will next be described.

OPERATION

When the thermostat (13) closes its contacts and supplies the low starting torque compressor (2), a signal is simultaneously sent to valve (5) and three-way valve (6). This signal can be a tension pulse, a permanent electrical supply, a pressure signal obtained following the compressor (2) being set in operation or any other signal compatible with the actuation of the mentioned valves (5,6). Possibly, signal delay devices (15), such as timers, can be used, in order to establish a certain time interval between starting up the compressor (2) and actuation of the valves (5,6). The compressor (2) starts up despite having a low starting torque due to equalized pressures being met with in the suction and discharge pipes (8, 9).

On receiving the signal, the three-way valve (6), which kept the discharge (9) and suction (8) pipes of the compressor (2) connected, changes its position and connects the discharge pipe (9) to the condenser (3). The valve (5), which kept communication blocked between the filter (10) and capillary (11), opens to permit the flow of refrigerant. This situation is maintained until the thermostat cuts off the supply of the compressor (2), at which a new signal (tension cut, power impulse, pressure signal or any other compatible with actuation of the valves) returns them to their initial state.

On the compressor (2) halting the condensation pressure reduces until the biphase equilibrium value to the environmental temperature and the pressure in the evaporator (4) rises at equilibrium value to the environmental temperature surrounding the evaporator (4).

I claim:

1. Improved refrigeration system, comprising a compressor (2), a condenser (3), an evaporator (4), a suction pipe (8) extending between the condenser and the evaporator, and a valve (5) adapted to control refrigerant flow between the condenser (3) and the evaporator (4), wherein a three-way valve (6) is provided between the condenser (3) and the compressor (2), said three-way valve (6) establishing a bypass (7) between the compressor (2) and the suction pipe (8) during stoppage of the compressor (2) to prevent reflux of refrigerant from the condenser (3) to the compressor.

2. System according to claim 1, wherein the compressor (2) is a low starting torque compressor.

3. System according to claims 1 and 2, wherein a delay device is provided to delay actuation of the valves (5, 6) a period of time after energization of the compressor.

* * * * *

UNITED STATES PATENT AND TRADEMARK OFFICE
CERTIFICATE OF CORRECTION

PATENT NO.   : 5,822,999
DATED        : October 20, 1998
INVENTOR(S)  : Salo

It is certified that error appears in the above-identified patent and that said Letters Patent is hereby corrected as shown below:

Column 1, Line 6, after "consumption" and insert --and--.

Column 2, Line 33, delete "used with" and insert --used. With--.

Signed and Sealed this

Second Day of March, 1999

Attest:

Q. TODD DICKINSON

*Attesting Officer*     *Acting Commissioner of Patents and Trademarks*